United States Patent [19]
Hashimoto et al.

[11] Patent Number: 5,438,700
[45] Date of Patent: Aug. 1, 1995

[54] DIGITAL MOBILE RADIO COMMUNICATION APPARATUS

[75] Inventors: Kazuya Hashimoto; Takashi Murakami, both of Tokyo, Japan

[73] Assignee: NEC Corporation, Japan

[21] Appl. No.: 983,789

[22] Filed: Nov. 30, 1992

[30] Foreign Application Priority Data
Nov. 30, 1991 [JP] Japan .................. 3-342079

[51] Int. Cl.6 ............... H04B 1/40; H04B 17/00; H04M 11/00
[52] U.S. Cl. ............... 455/89; 455/67.4; 379/59; 379/100; 375/224
[58] Field of Search ........... 455/67.4, 67.7, 68, 455/72, 89, 115, 116; 379/100, 59; 375/10

[56] References Cited
U.S. PATENT DOCUMENTS

| | | | |
|---|---|---|---|
| 4,881,129 | 11/1989 | Mitsuhashi | 379/100 |
| 4,901,343 | 2/1990 | Yamaguchi | 379/100 |
| 4,908,851 | 3/1990 | Kotani et al. | 379/100 |
| 5,073,921 | 12/1991 | Nomura et al. | 379/100 |
| 5,077,786 | 12/1991 | Hashimoto | 379/100 |

Primary Examiner—Edward F. Urban
Assistant Examiner—Mark D. Wisler
Attorney, Agent, or Firm—Ostrolenk, Faber, Gerb & Soffen

[57] ABSTRACT

A digital mobile radio communication apparatus having a speech signal testing function and a data transmitting and receiving function. A pair of terminals are selectively used as speech signal test terminals or data transmit and receive terminals via switches.

1 Claim, 2 Drawing Sheets

DIGITAL MOBILE RADIO COMMUNICATION APPARATUS

BACKGROUND OF THE INVENTION

The present invention relates to a digital mobile radio communication apparatus having a speech signal testing function and a data transmitting and receiving function and, more particularly, to a digital mobile radio communication apparatus capable of reducing the number of terminals to be connected to external equipment.

It is a common practice to provide a radio communication apparatus of the type described at least with test terminals and transmit and receive terminals for implementing the speech signal testing function and the data transmitting and receiving function, respectively. To test a speech signal, the test terminals are connected to measuring equipment. Then, a speech entered on a microphone is routed through a first audio processor, a linear coder, the measuring equipment, a linear decoder, and a second audio processor to a speaker. On the other hand, to transmit and receive data, the transmit and receive terminals are connected to a facsimile transceiver, personal computer or similar data terminal equipment. In this condition, data to be transmitted is fed from the data terminal equipment to an antenna via the terminals, a channel coder, a modulator, and a duplexer. Data coming in through the antenna is delivered to the data terminal equipment via the duplexer, a demodulator, a channel decoder, and the terminals.

The problem with such a conventional apparatus is that it is not operable without resorting to exclusive terminals for testing a speech signal and exclusive terminals for transmitting and receiving data. This increases the number of terminals and, therefore, obstructs the decrease in the size and weight of the apparatus.

SUMMARY OF THE INVENTION

It is therefore, an object of the present invention to provide a digital mobile radio communication apparatus achieving both the speech signal testing function and the data transmitting and receiving function with a minimum number of terminals.

DESCRIPTION OF THE PREFERRED EMBODIMENT

Figure 1:
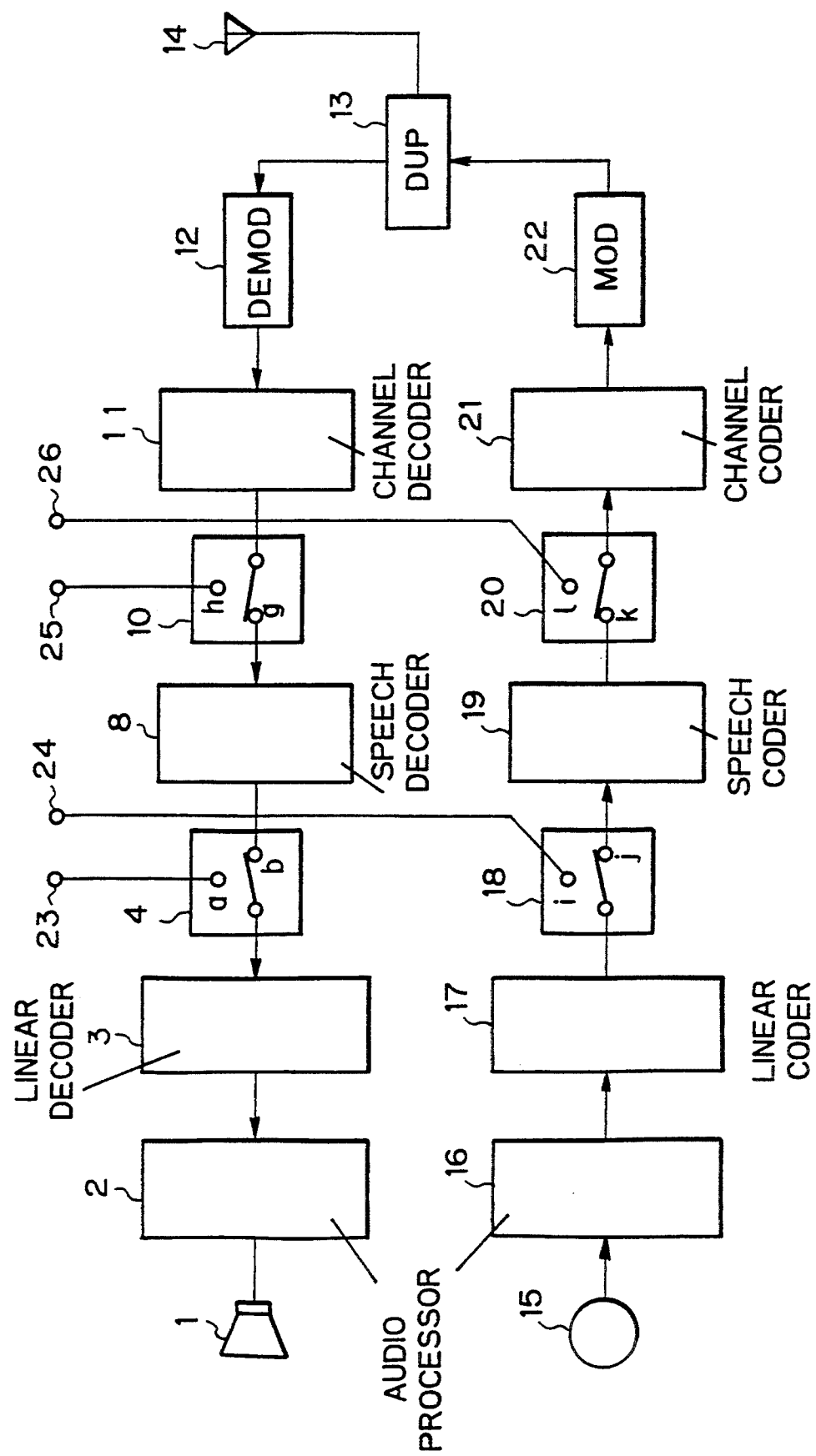
FIG. 1 is a block diagram schematically showing a conventional digital mobile radio communication apparatus.

To better understand the present invention, a brief reference will be made to a conventional digital radio communication apparatus having a speech signal testing function and a data transmitting and receiving function, shown in FIG. 1. As shown, the apparatus has test two terminals 23 and 24 connectable to predetermined measuring equipment, not shown for testing a speech signal and two transmit and receive terminals 25 and 26 connectable to a facsimile transceiver, personal computer or similar data terminal equipment, not shown, for transmitting and receiving data. Switches 4 and 18 are respectively connected to the test terminals 23 and 24 and have respectively stationary contacts a and b and stationary contacts i and j. To test a speech signal, the switches 4 and 18 have their movable contacts connected to the stationary contacts a and i, respectively. As a speech signal is entered on a microphone 15, it is routed through an audio processor 16, a linear coder 17, the switch 18, the test terminal 24, the measuring equipment, not shown, the test terminal 23, the switch 4, a linear decoder 3, an audio processor 2, and a speaker 1. On the other hand, to transmit and receive data, switches 10 and 20 connected to the transmit and receive terminals 25 and 26, respectively, have their movable contacts connected to stationary contacts h and l. At the same time, the transmit and receive terminals 25 and 26 are connected to the data terminal equipment, not shown. Data to be transmitted is delivered from the data terminal equipment to an antenna 14 via the transmit and receive terminal 26, the switch 20, a channel coder 21, a modulator 22 (MOD), and a duplexer 13 (DUP). On the other hand, data coming in through the antenna 14 is routed through the DUP 13, a demodulator (DEMOD) 12, a channel decoder 11, the switch 10, and the transmit and receive terminal 25 to the data terminal equipment.

The problem with the conventional apparatus described above is that the test terminals 23 and 24 and the transmit and receive terminals 25 and 26 have to be provided independently of each other, increasing the number of terminals and, therefore, obstructing the decrease in the size and weight of the apparatus, as discussed earlier.

Figure 2:
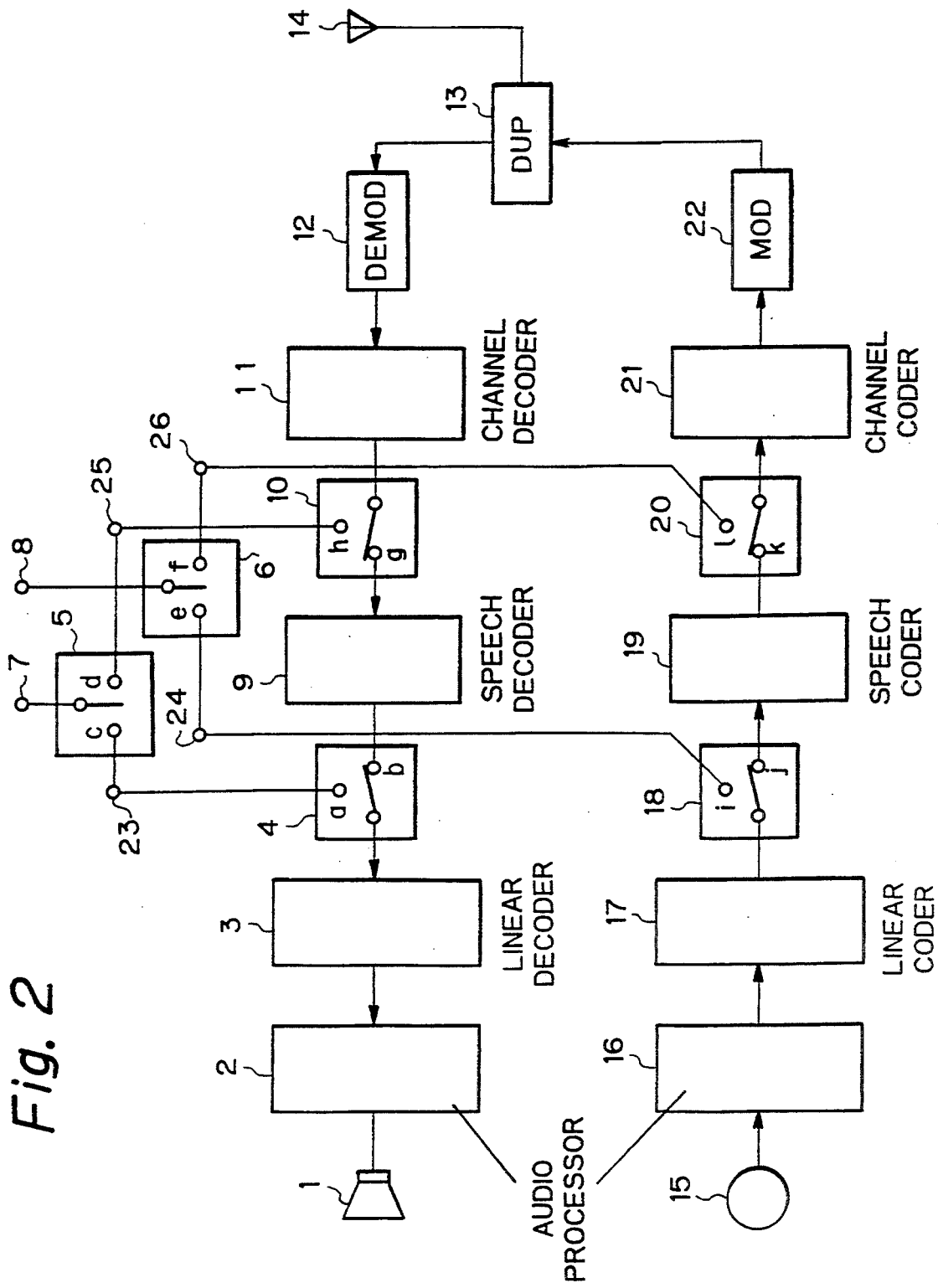
FIG. 2 is a block diagram schematically showing a digital mobile radio communication apparatus embodying the present invention.

Referring to FIG. 2, a digital radio communication apparatus embodying the present invention is shown which eliminates the problem stated above. In the figures, the same or similar constituents are designated by like reference numerals for simplicity. As shown, the apparatus has a microphone 15 from which an analog speech signal is fed to an audio processor 16. The audio processor 16 processes, e.g., amplifies the analog signal and delivers the resulting signal to a linear coder 17. The linear coder 17 converts the analog signal to a digital signal and feeds it to a speech coder 19 via a switch 18. The speech coder 19 transforms the digital signal to data by compression and delivers the data to a channel coder 21 via a switch 20. The channel coder 21 adds redundant bits to the data while rearranging the data. The rearranged data is fed from the channel coder 21 to a modulator (MOD) 22. The MOD 22 modulates the input signal. The resulting digital modulated signal is transmitted via a duplexer (DUP) 13 and an antenna 14. On the other hand, a digital modulated signal received by the antenna 14 is routed through the DUP 13, a demodulator (DEMOD) 12, a channel decoder 11, a switch 10, a speech decoder 9, a switch 4, a linear decoder 3 and an audio processor 2 to a speaker 1. As a result, a speech signal is produced via the speaker 1.

In the illustrative embodiment, the speech signal testing function and the data transmitting and receiving function share common terminals 7 and 8 and common switches 5 and 6 connected to the terminals 7 and 8, respectively. To use the terminals 7 and 8 as test terminals, the switches 5 and 6 have their movable contacts connected to stationary contacts c and e, respectively. In this condition, measuring equipment for measuring a speech signal is connected to the terminals 7 and 8. To use the terminals 7 and 8, as transmit and receive terminals, the movable contacts of the switches 5 and 6 are connected to stationary contacts d and f, respectively, while the movable contacts of the switches 10 and 20 are connected to stationary contacts h and 1, respectively. In this configuration, the terminals 7 and 8 may be connected to the facsimile, personal computer or similar data terminal equipment.

As stated above, the communication apparatus shown in FIG. 2 implements two different functions, i.e., the speech signal testing function and the data transmitting and receiving functions with only two common terminals 7 and 8.

In summary, it will be seen that the present invention provides a digital mobile radio communication apparatus operable with a smaller number of terminals than conventional one and, therefore, small size and light weight. This unprecedented advantages is derived from a unique configuration wherein a pair of terminals are selectively used as speech signal test terminals or data transmit and receive terminals via switches or similar means.

Various modifications will become possible for those skilled in the art after receiving the teachings of the present disclosure without departing from the scope thereof.

What is claimed is:

1. A digital mobile telephone apparatus having a channel decoder, a speech decoder, a linear decoder, a linear coder, a speech coder, and a channel coder, said apparatus comprising:

first and second terminals for either receiving or transmitting signals of a first type in a first mode of operation of the apparatus or for receiving or transmitting signals of a second type in a second mode of operation of the apparatus;

a first switch connected between said channel decoder and said speech decoder for connecting an output of said channel decoder to an input of said speech decoder in a third mode of operation of the apparatus and for disconnecting said output of said channel decoder from said input of said speech decoder and connecting said output of said channel decoder to a third terminal in said first mode of operation;

a second switch connected between said speech coder and said channel coder for connecting an input of said channel coder to an output of said speech coder in said third mode of operation and for disconnecting said input of said channel coder from said output of said speech coder and connecting said input of said channel coder to a fourth terminal in said first mode of operation;

a third switch for connecting an input of said linear decoder to an output of said speech decoder in said third mode of operation and for disconnecting said input of said linear decoder from said output of said speech coder and connecting said input of said linear decoder to a fifth terminal in said second mode of operation;

a fourth switch for connecting an output of said linear coder to an input of said speech coder in the third mode of operation and for disconnecting said output of said linear coder from said input of said speech coder and connecting said output of said linear coder to a sixth terminal in said second mode of operation;

a fifth switch for selectively connecting said third terminal to said first terminal in said first mode of operation or connecting said fifth terminal to the first terminal in said second mode of operation; and a sixth switch for selectively connecting said fourth terminal to said second terminal in said first mode of operation or connecting said sixth terminal to said second terminal in said second mode of operation.

* * * * *